Patented Nov. 29, 1938

2,138,471

UNITED STATES PATENT OFFICE 2,138,471

ALKYLATED PHENYLPHENOLS

Edgar C. Britton, Gerald H. Coleman, and Ralph P. Perkins, Midland, Mich., assignors to The Dow Chemical Company, Midland, Mich., a corporation of Michigan No Drawing. Original application May 8, 1936, Serial No. 78,640. Divided and this application August 21, 1936, Serial No. 97,246

8 Claims. (Cl. 260—620)

This invention concerns phenylphenols having branched-chain alkyl substituents each of which contains five or more carbon atoms, and at least one of which substituents is attached to the hydroxylated benzene ring. The expression "branched-chain" as herein used refers to alkyl groups which are secondary-, iso-, or tertiary-, e. g. tertiary-amyl, iso-hexyl, secondary-heptyl, tertiary-octyl, etc. We have prepared members of the above new class of compounds, determined certain of their physical properties whereby they can readily be identified, and have found them particularly useful as microbicides, antiseptics, preservatives, intermediates, etc.

These compounds are for the most part viscous, high boiling, water-white liquids, which are substantially insoluble in water but somewhat soluble in dilute aqueous alkaline solutions and most organic solvents. They can be prepared by reacting a phenylphenol with a suitable alkyl halide, in the presence of a Friedel-Craft catalyst such as aluminum chloride, aluminum bromide, iron chloride, zinc chloride, Tonsil, etc. Such halides may be either normal-, secondary-, iso-, or tertiary-, for example, tertiary-amyl chloride, iso-hexyl chloride, secondary-amyl chloride, normal-hexyl bromide, etc. Whereas the phenylphenol and the alkyl halide can be reacted together in any desired proportions, maximum yields of the mono-alkyl substituted phenylphenols are generally obtained when the phenylphenol is present in the reaction mixture in considerable excess over the amount theoretically required. The yield of poly-alkyl substituted derivatives ordinarily increases as the molecular proportion of alkyl halide to phenylphenol is raised. However, regardless of the proportions used a mixture of the mono- and poly-substitution products is generally formed.

In preparing derivatives of ortho- and meta-phenylphenols the reaction is conveniently carried out in the liquid phase in the presence of the catalyst, slowly adding the alkyl halide below the surface of the liquid reaction mixture with stirring, and thereafter heating and stirring the mixture until the reaction is complete, i. e. until hydrogen halide is no longer evolved. The reaction temperature is dependent upon the particular reactants involved, but is usually between about 75° and about 175° C., although higher temperatures may be employed. If desired, the reactants may be dispersed in an inert solvent, e. g. carbon tetrachloride, ethylene chloride, etc., in which case the use of somewhat lower reaction temperatures is practicable. The reaction is usually substantially complete in from 1 to 10 hours, depending upon the particular reactants and the proportions thereof employed. After the reaction is completed, the crude alkylated mixture is washed with dilute aqueous hydrochloric acid to decompose and remove residual catalyst, and the desired products separated, e. g. by fractional distillation in vacuo, etc.

In preparing alkyl derivatives of para-phenylphenol, a similar process may be followed except that the use of an inert solvent is preferable, since at the high temperatures required to liquefy the phenol by heat, optimum yields are usually not obtained in reactions involving the lower boiling alkyl halides.

Other methods by which the compounds may be prepared are: (1) by hydrolysis of suitable alkylated halo-diphenyl derivatives, e. g. 2-tertiary-amyl-4-bromo-diphenyl, 2-bromo-5-hexyl-diphenyl, etc.; (2) by condensation of the phenylphenols with olefinic materials containing at least five carbon atoms, e. g. amylene, di-isobutylene, etc.; (3) by diazotization of the alkylated amino-diphenyls, e. g. 2-amyl-4-amino-diphenyl, 2-amino-5-tertiary-amyl-diphenyl, etc., and decomposition of the resulting diazonium complex with aqueous alkali; (4) by the esterification of the phenylphenols with branched-chain aliphatic organic acids, rearrangement of such esters with anhydrous aluminum chloride, and reduction of the resulting ketonic bodies; and (5) by rearrangement of the suitable phenylphenol branched-chain alkyl ethers with a catalyst such as aluminum chloride.

The following examples describe in detail the preparation of certain individual members of our new class of compounds, but are not to be construed as limiting the invention.

*Example 1.—Mono- and di-(alpha-beta-dimethyl-propyl)-6-phenylphenol*

A mixture of 1700 grams (10 mols) of ortho-phenylphenol and 66.5 grams (0.5 mol) of finely divided anhydrous aluminum chloride (AlCl₃) was heated with stirring to temperatures ranging from 135° to 150° C. for a period of 8 hours, during which time 320 grams (3 mols) of iso-amyl chloride, was slowly introduced with stirring below the surface of the reaction batch. Stirring was continued for one-half hour, during which time the temperature was allowed to rise to 160° C., after which the viscous reaction mixture was washed successively with dilute aqueous hydrochloric acid and water and fractionally distilled under reduced pressure. 1229 grams (7.23 mols) of unreacted ortho-phenylphenol, 571 grams (2.38 mols) of mono-amyl-6-phenylphenol, and 68 grams (0.22 mol) of 2.4-diamyl-6-phenylphenol were separated out of the crude reaction mixture.

The mono-amyl fraction was refractionated and found to have, for the most part, the probable formula: 4-(alpha-beta-dimethyl-propyl)-6-phenylphenol, which compound is a colorless, viscous liquid having a boiling point of approximately 176–8° C. at 7 millimeters pressure and specific gravity 1.035 at 20°/4° C.

2, 4-di-(alpha-beta-dimethyl-propyl)-6-phenylphenol is a colorless, viscous liquid having the boiling point 207–9° C. at 7 millimeters pressure, and specific gravity 0.992 at 20°/4° C.

*Example 2.—Mono- and di-tertiary-amyl-6-phenylphenol*

In a similar manner, 585 grams (3.44 mols) of orthophenylphenol, 26.5 grams (0.2 mol) of aluminum chloride, and 106.5 grams (1 mol) of tertiary-amyl chloride were reacted together at 145° C. over a period of 3 hours. After removal of catalyst from the reacted mixture, fractionation under reduced pressure resulted in the recovery of 416 grams (2.45 mols) of unreacted ortho-phenylphenol, 178 grams (0.74 mol) of a mono-teritary-amyl-6-phenylphenol product, and 40 grams (0.13 mol) of 2, 4-di-tertiary-amyl-6-phenylphenol.

Upon refractionation of the mono-amyl product was found to be principally 4-tertiary-amyl-6-phenylphenol, which compound has a boiling point of 153–5° C. at 3 millimeters pressure, and a specific gravity of 1.035 at 20°/4° C.

*Example 3.—Mono- and di-tertiary-hexyl-6-phenylphenol*

1700 grams (10 mols) of ortho-phenylphenol, 361.5 grams (3 mols) of tertiary-hexyl chloride, and 66.5 grams (0.5 mol) of aluminum chloride were reacted together at temperatures ranging from 83° to 88° C. for a period of 3 hours. 1244 grams (7.32 mols) of unreacted ortho-phenylphenol, 621 grams (2.45 mols) of a mono-tertiary-hexyl-6-phenylphenol product, and 68 grams (0.2 mol) of crude 2, 4-di-tertiary-hexyl-6-phenylphenol were separated by fractional distillation from the reaction mixture.

The mono-alkylated fraction was found on analysis to be a mixture of the 2- and 4-mono-tertiary-hexyl-phenylphenol isomers, but to consist principally of the para compound. 4-(alpha-methyl-alpha-ethyl-propyl)-6-phenylphenol is a thick viscous liquid having a boiling point of 183° C. at 7 millimeters pressure and specific gravity 1.023 at 20°/4° C.

2, 4-di-(alpha-methyl-alpha-ethyl-propyl)-6-phenylphenol is a colorless, viscous liquid having the boiling point 225–8° C. at 7 millimeters pressure, and specific gravity 0.981 at 20°/4° C.

*Example 4.—Tertiary-butyl- and tertiary-octyl-6-phenylphenol*

1700 grams (10 mols) of ortho-phenylphenol, 336 grams (3 mols) of di-isobutylene (boiling point 101–2° C.) and 66.5 grams (0.5 mol) of aluminum chloride were reacted together over a period of 6 hours and at a temperature of 145° to 150° C. substantially as previously described. 870 grams (5.12 mols) of unreacted ortho-phenyl-phenol was recovered as a low boiling fraction from the reaction mixture. 903 grams of an alkylated product boiling chiefly between 160° and 170° C. at 6 millimeters pressure, and 251 grams of a material boiling chiefly between 175° and 200° C. at 6 millimeters pressure, were obtained by fractional distillation of the alkylated residue.

The lower boiling alkylated mixture was refractionated and found to be, for the most part, 4-tertiary-butyl-6-phenylphenol.

Refractionation of the higher boiling mixture indicated it to be a mixture of 2, 4-di-tertiary-butyl-6-phenylphenol and mono-tertiary-octyl (i. e. alpha-alpha-gamma-gamma-tetra-methyl-n-butyl)-6-phenylphenol. This mixture was a viscous, colorless liquid boiling at 192°–200° C. at 6 millimeters pressure and having a specific gravity of 0.974 at 60°/4° C.

*Example 5.—Mono- and di-secondary-amyl-6-phenylphenol*

1700 grams (10 mols) of ortho-phenylphenol and 66.5 grams (0.5 mol) of finely divided anhydrous aluminum chloride were mixed together and heated to 130° C. To this rapidly agitated mixture 320 grams (3 mols) of n-amyl chloride was added over a period of 2 hours. The temperature was then increased to 160° C. and agitation was continued for an additional 2 hours, after which the aluminum chloride catalyst was removed by washing with dilute aqueous hydrochloric acid and the crude reaction batch was fractionally distilled to recover 1244 grams (7.32 mols) of unreacted ortho-phenylphenol, 572 grams (2.38 mols) of a mono-amyl-phenylphenol product, and 72 grams (0.23 mol) of a mixture of di-amyl-phenylphenol derivatives.

The mono-amyl product upon refractionation was found to be a compound boiling at 173–5° C. at 6 millimeters pressure and having a specific gravity of 1.027 at 20°/4° C., the probable formula being 4-(alpha-methyl-n-butyl)-6-phenyl-phenol.

The di-amyl-6-phenylphenol boiled at 210–2° C. at 6 millimeters pressure and had a specific gravity of 0.990 at 20°/4° C.

*Example 6.—2-isoamyl-6-phenylphenol*

A mixture of 170 grams (1 mol) of ortho-phenylphenol, and 102 grams (1 mol) of isovaleric acid was heated with stirring to 135° C. for 2 hours during which time 77 grams (0.5 mol) of phosphorus oxychloride was slowly added to the reaction mixture. Heating and stirring were continued until no more hydrogen chloride gas was evolved after which the reaction mixture was cooled, washed with water, dried, and fractionally distilled to recover a substantially quantitative yield of ortho-phenyl-phenyl-isovalerate.

0.86 mol of the above ester was treated with 0.95 mol of anhydrous aluminum chloride at 150–160° C. for 2 hours, which treatment resulted in a rearrangement of the ester to form a mixture comprising 3-phenyl-2-hydroxy- and 5-phenyl-4-hydroxy-valerophenone. This mixture was washed successively with dilute aqueous hydrochloric acid and water, dried, and the 3-phenyl-2-hydroxy-valerophenone separated therefrom by selective extraction with petroleum ether. The resulting extract was heated to drive off the organic solvent and the ketonic residue reduced with mossy zinc and 20% aqueous hydrochloric acid solution to form a crude mono-isoamyl-phenylphenol product. 2-isoamyl-6-phenylphenol was separated therefrom by fractional distillation as a colorless viscous liquid having a boiling point of 165-170° C. at 4-5 millimeters pressure and specific gravity 1.0500 at 20°/4° C.

Instead of employing a single phenylphenol compound as a reactant, mixtures of the isomeric phenylphenols may be reacted with a suitable alkylating agent to form mixtures of compounds falling within the scope of our invention. Phenylphenols substituted in either phenyl group by various inert hydrocarbon residues, e. g. alkyl, aryl, cycloalkyl, alkyloxy, aryloxy, etc., may also be utilized for the preparation of valuable new compounds by the methods described. For instance, 4'-ethyl- 6-phenylphenol, 2 - methyl - 6 - phenylphenol, 2' - isopropyl - 3 - phenylphenol, cyclohexyl - phenylphenol, 4'-methoxy-4-phenylphenol, 2-phenoxy-4-phenylphenol, 4' - methyl-4-methoxy - 6 - phenylphenol, etc., may be substituted in the above reactions. Similarly mixtures of various alkyl halides, of olefines, or of alkyl halides and olefines, have been found suitable for use in the preparation of our new materials.

Branched-chain alkyl phenylphenols in which the alkyl residues are substituted in the meta position with respect to the hydroxyl, may readily be prepared, (1) by the hydrolysis of any 1-halo-3-branched-chain-alkyl-diphenyl, or (2) by the diazotization of a 1-amino-3-alkyl-diphenyl and decomposition of the resulting diazonium derivative with aqueous alkali. Poly-alkyl derivatives of the present class containing three or more branched-chain alkyl groups may be prepared by the exhaustive alkylation of meta-phenylphenol or by employing as a reactant in the alkylation process a phenylphenol product wherein one or more alkyl groups are already attached to the substituting phenyl group or are substituted in the hydroxylated benzene ring in the meta-position with respect to the hydroxyl.

The mixed reaction products resulting from the described condensations may advantageously be utilized as antiseptics, etc., without separating therefrom the individual alkylated-phenylphenol constituents. Such mixtures are viscous, high boiling liquids, soluble in dilute aqueous and alcoholic alkaline solutions and most organic solvents.

This application is a division of our prior application Serial No. 78,640, filed May 8, 1936.

Other modes of applying the principle of our invention may be employed instead of those explained, change being made as regards the materials employed, provided the products described in the following claims be thereby obtained.

We therefore particularly point out and distinctly claim as our invention:—

1. An alkyl-phenylphenol compound substituted in the hydroxylated benzene ring with at least one branched-chain alkyl group containing at least five carbon atoms.

2. An alkyl-phenylphenol compound substituted in the hydroxylated benzene ring with at least one branched-chain alkyl group containing from five to eight carbon atoms inclusive.

3. An alkyl-ortho-phenylphenol compound having at least one branched-chain alkyl group containing more than four carbon atoms substituted in the hydroxylated benzene nucleus.

4. An alkyl-ortho-phenylphenol compound containing at least one branched-chain amyl group in the hydroxylated benzene nucleus.

5. An alkyl-ortho-phenylphenol compound containing at least one branched-chain hexyl group in the hydroxylated benzene nucleus.

6. 4-tertiary-amyl-6-phenylphenol.

7. 4-tertiary-hexyl-6-phenylphenol.

8. Tertiary-octyl-6-phenylphenol.

EDGAR C. BRITTON.
GERALD H. COLEMAN.
RALPH P. PERKINS.